United States Patent [19]

Weisshappel et al.

[11] 4,218,672
[45] Aug. 19, 1980

[54] INSTALLATION IN A VEHICLE FOR INDICATING THE LOAD DISTRIBUTION AND FOR WARNING AGAINST OVERLOADS

[75] Inventors: Helmut Weisshappel; Walter Schmid, both of Sindelfingen, Fed. Rep. of Germany

[73] Assignee: Daimler-Benz Aktiengesellschaft, Fed. Rep. of Germany

[21] Appl. No.: 821,250

[22] Filed: Aug. 2, 1977

[30] Foreign Application Priority Data

Aug. 17, 1976 [DE] Fed. Rep. of Germany ....... 2636889

[51] Int. Cl.² ........................................... G08B 21/00
[52] U.S. Cl. .................................. 340/52 R; 340/666; 340/685; 200/85 R; 180/290
[58] Field of Search ................ 340/27 R, 52 R, 52 H, 340/58, 272, 267 C; 200/85 R, 86 R; 180/100

[56] References Cited

U.S. PATENT DOCUMENTS 3,646,512  2/1972  Borgstede .......................... 340/52 R
3,900,828  8/1975  Lage et al. ......................... 340/27 R Primary Examiner—Alvin H. Waring
Attorney, Agent, or Firm—Craig & Antonelli

[57] ABSTRACT

An installation in a vehicle for indicating the load distribution and for warning against overloads with load-value transmitters coordinated to the vehicle axles; in which a first load-value transmitter coordinated with a vehicle axle for respective lateral sides of the vehicle includes a load-dependent threshold switch whereby the two threshold switches connect the positive terminal of the battery by way of the ignition lock with a filter, and the filter output is connected with a switching device which turns on the load-distribution indication and/or the overload warning.

20 Claims, 2 Drawing Figures

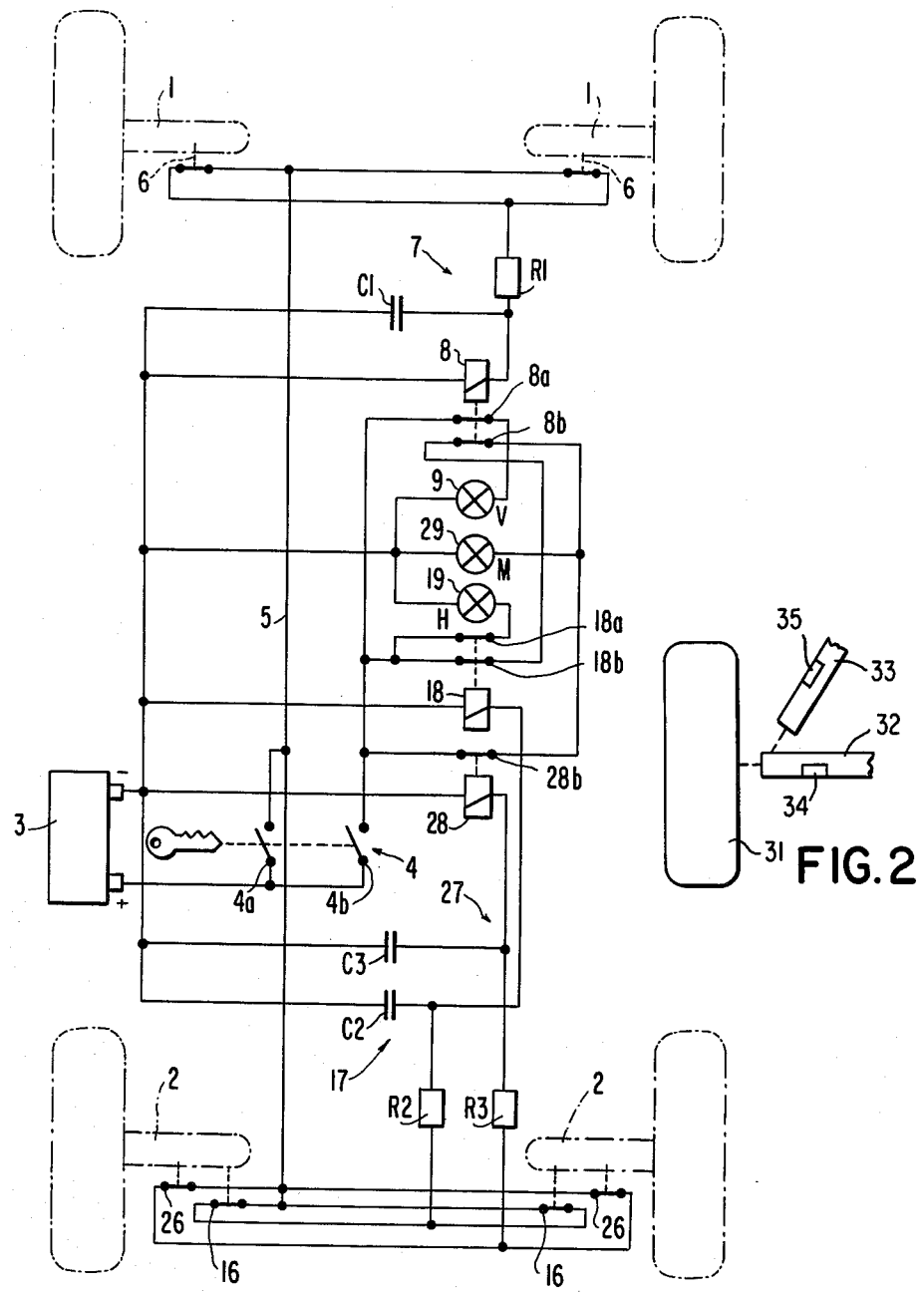
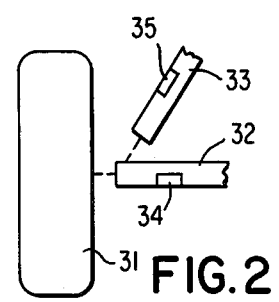
FIG. 2
FIG. 1

INSTALLATION IN A VEHICLE FOR INDICATING THE LOAD DISTRIBUTION AND FOR WARNING AGAINST OVERLOADS

The present invention relates to an installation on a vehicle, especially motor vehicles, for the indication of the load distribution and for the warning against overloads, with at least one limit value transmitter or pick-up device coordinated to an axle.

Large luggage spaces and high engine outputs mislead many vehicle drivers to overload their vehicles. Apart from damages which can be inflicted on the vehicle, the driving behavior changes noticeably as a result of a unilateral or strong loading. The recognition that the driving dynamics depend strongly from the degree of loading, however, cannot be assumed as a part of the general knowledge.

Weighing or measuring devices for the vehicle load are known as such, for example, potentiometers whose resistance value changes with the degree of inward spring deflection of the shock absorbers. A weighing installation in commercial vehicles is known from the German Auslegeschrift No. 2,230,219.

It is the aim of the present invention to provide an installation which informs the driver, on the one hand, concerning the condition of the load and warns him in case of overloads so that he can adjust his driving behavior accordingly and, on the other, permits a recognition of the failure of the indicating or warning installation.

The underlying problems are solved according to the present invention in that a first load transmitter for each side of the axle includes a load-dependent threshold switch, in that the two threshold switches connect the positive terminal of the battery by way of the ignition lock with a filter, and in that the filter output leads to a switching device which turns on the load distribution indication and/or the overload warning.

Accordingly, it is an object of the present invention to provide an installation in a vehicle for indicating the load-distribution and for warning against overloads, which avoids by simple means the aforementioned shortcomings and drawbacks encountered in the prior art.

Another object of the present invention resides in an installation for indicating the load-distribution of a motor vehicle and for warning against overloads which is simple in construction, utilizes relatively few parts and is extremely reliable in operation.

A further object of the present invention resides in an indicating and warning system of the type described above which permits a ready recognition in case of failure of the indicating or warning system.

These and further objects, features and advantages of the present invention will become more apparent from the following description when taken in connection with the accompanying drawing wherein:

FIG. 1 is a schematic circuit diagram of one embodiment of a load-distribution indicating and overload warning system in accordance with the present invention; and FIG. 2 schematically illustrates in partial view, the arrangement of a load transmitter on an axle guide bearing and on a shock absorbing housing.

Referring now to FIG. 1 of the drawing, an all-purpose commerical vehicle with a loading surface and with coupling possibilities of working aggregates such as snow plow, working crane, etc. is contemplated for the illustrated embodiment. The wheels of the front axle 1 and the wheels of the rear axle 2 are illustrated symbolically in dash and dotted lines. Furthermore, the vehicle battery 3 and the ignition lock generally designated by reference numeral 4 with the contacts 4a and 4b are also shown in the drawing only schematically. Contact 4a connects with a turned-on ignition lock the positive terminal of the battery 3 with a line 5, which leads by way of two parallelly connected, conventional threshold switches 6 coordinated to the front axle, which are intended to respond in case of a load below the overload and which are symbolically represented by two switching contacts to an integrating element generally designated by reference numeral 7 which consists of a resistance R1 and of a condenser C1. The energizing winding 8 of a relay with two normally closed contacts 8a and 8b is connected in parallel with the condenser C1. The normally closed contact 8a is connected in a circuit which leads from the positive terminal of the battery 3 by way of the contact 4b of the ignition lock 4 to an indicating lamp 9 and from the latter to the negative terminal of the battery 3. With this arrangement, the integrating element 7 forms a filter and the relay 8 the switching device.

When turning on the ignition, i.e., when closing the contacts 4a and 4b, current flows by way of the two closed threshold switches 6 to the integrating element 7. The condenser C1 charges within a predetermined time and the relay 8 is energized with predetermined delay. From the time of the turning on of the ignition up to the attraction of the relay 8, current flows through the indicating lamp 9 by way of the contacts 4b and 8a. The indicating lamp 9 lights up for a predetermined time and then becomes extinguished with the opening of the normally closed contact 8a when the armature of the relay 8 is attracted. It can be seen therewith that the indicating lamp 9 functions. If the vehicle is now so loaded that both threshold switches 6 open, then the condenser C1 discharges by way of the relay 8 and the latter drops out or becomes de-energized after a short period of time so that the indicating lamp 9 lights up and indicates that the front axle is strongly loaded.

A similar installation with the corresponding parts thereof designated by reference numerals 16, 17, R2, C2, 18, 18a, 18b and 19 is coordinated to the rear axle with the wheels 2 and operates in the same manner, whereby in this case the indicating lamp 19 lights up.

Additionally, a lamp 29 is provided which additionally lights up when both axles are so strongly loaded that the relays 8 and 18 are de-energized and drop off. The lamp 29 is then supplied with current by way of the normally closed contacts 8b and 18b and thus warns in case of overload of the vehicle. It is meaningful, for example, to let the indicating lamps 9 and 19 light up in yellow color and let the warning lamp 29 light up in red color.

In the illustrated embodiment, a further installation with the parts thereof designated by reference numerals 26, 27, R3, C3, 28, and 28b is coordinated to the rear axle, with a second load-value transmitter whose threshold switch 26 is so adjusted that it opens in case of overload of the rear axle. The remaining construction corresponds to the two above-described installations with the sole difference that the relay 28 includes only a single normally closed contact 28b which connects the positive terminal of the battery 3 directly with the warning lamp 29.

With a corresponding selection of the time constants of the integrating elements 7, 17, and 27, the lamps light up only with a corresponding load but not in case of oscillations or swinging motions of the vehicle as a result of road unevenesses such as holes, etc. In order to indicate only loads of the axle, the threshold switches of each load-value transmitter are connected in parallel. As a result thereof, a lighting up of the lamps is prevented also when driving fast through relatively longer curves.

If now either the yellow indicating lamps 9 or 19 light up, then the front or rear axle is strongly loaded and the driver can adjust his driving behavior accordingly. If, in addition to the indicating lamp 19, the red warning lamp 29 lights up, then the rear axle is overloaded whereas if all three lamps light up, then the vehicle is overloaded by reason of strong loading of both axles. The resistances R2 and R3 can be replaced by a common resistance ahead of the threshold switches.

It is also within the scope of the present invention to use in lieu of the integrating element a differentiating element, whereby the threshold switches are constructed as closing devices and are connected in parallel to the condenser of the differentiating element whereas they are connected in series to one another, and whereby the relay includes working contacts, or that other structural elements, for example, integrated circuits, take over the described functions.

FIG. 2 schematically illustrates in partial view, a wheel 31 with an axle guide bearing arrangement 32 and a shock absorber housing arrangement 33 being connected in a conventional manner. For providing a loading indication, a threshold switch 34 may be accommodated in the axle guide bearing arrangement and a threshold switch 35 may be accommodated in the shock absorber housing arrangement.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An installation in a vehicle for indicating load distribution and warning against overloads comprising an electrical power source and ignition switch means for activating said power source, load-value transmitter means coordinated to a vehicle axle including at least a first load value transmitter means having at least one load dependent threshold switch coordinated with the vehicle axle at respective lateral sides of the vehicle for detecting predetermined threshold load values, said threshold switches being operatively connected to said power source through said ignition switch means, indicator means for indicating load distribution and overload conditions of said vehicle, monitoring means connected to said threshold switches for monitoring functioning and/or operation of said indicator means, and switching means connected between said monitoring means and said indicator means for activating said indicator means, the installation further including a second load-value transmitter means coordinated to the axle including a pair of threshold switches adjusted to a larger load, and wherein said monitoring means and said switching means are associated with the said second load value transmitter means, said indicating means including an indicating lamp coordinated to each of the first load-value transmitter means, and in that upon response of the switching means of all of the first load-value transmitter means an overload condition is indicated, said switching means coordinated to said first load-value transmitter means including a first normally closed contact means which operatively connects an associated indicating means with said power source and a second normally closed contact means, the second normally closed contact means of all load-value transmitter means being connected in series and being operable to connect an overload warning lamp with said power source.

2. An installation according to claim 1, characterized in that the switching means of the second load-value transmitter means includes a normally closed contact means which operatively connects an overload warning lamp with the power source.

3. An installation according to claim 2, characterized in that said monitoring means essentially consists of an RC-integrating element.

4. An installation according to claim 2, characterized in that said monitoring means consists of an RC-differentiating element, in that the threshold switches are so constructed that they close upon exceeding a predetermined load and in that the threshold switches are connected in parallel to the condenser of the RC-differentiating element.

5. An installation according to claim 1, characterized in that the threshold switches are disposed in an axle guide bearing means.

6. An installation according to claim 1, characterized in that the threshold switches are disposed in a shock absorber housing means.

7. An installation according to claim 1, characterized in that the switching means of the second load-value transmitter means includes a normally closed contact means which operatively connects an overload warning lamp with the power source.

8. An installation according to claim 1, characterized in that the switching means includes a relay means having at least one normally closed contact.

9. An installation according to claim 8, characterized in that the threshold switches are so constructed to open upon exceeding a predetermined load.

10. An installation in a vehicle for indicating load distribution and warning against overloads comprising an electrical power source and ignition switch means for activating said power source, load-value transmitter means coordinated to a vehicle axle including at least a first load value transmitter means having at least one load dependent threshold switch coordinated with the vehicle axle at respective lateral sides of the vehicle for detecting predetermined threshold load values, said threshold switches being operatively connected to said power source through said ignition switch means, indicator means for indicating load distribution and overload conditions of said vehicle, monitoring means connected to said threshold switches for monitoring functioning and/or operation of said indicator means, and switching means connected between said monitoring means and said indicator means for activating said indicator means, said monitoring means includes an RC-integrating element for controlling operation of said indicator means.

11. An installation in a vehicle for indicating load distribution and warning against overloads comprising an electrical power source and ignition switch means for activating said power source, load-value transmitter means coordinated to a vehicle axle including at least a first load value transmitter means having at least one load dependent threshold switch coordinated with the vehicle axle at respective lateral sides of the vehicle for detecting predetermined threshold load values, said threshold switches being operatively connected to said power source through said ignition switch means, indicator means for indicating load distribution and overload conditions of said vehicle, monitoring means connected to said threshold switches for monitoring functioning and/or operation of said indicator means, and switching means connected between said monitoring means and said indicator means for activating said indicator means, said monitoring means consists of an RC-differentiating element for controlling operation of said indicator means, in that the threshold switches are so constructed that they close upon exceeding a predetermined load and in that the threshold switches are connected in parallel to the condenser of the RC-differentiating element.

12. An installation according to claim 10, wherein said load value transmitter means includes at least a pair of said threshold switches, one threshold switch at each lateral side of the vehicle, said pair of threshold switches being normally closed to connect said power source to said monitoring means.

13. An installation according to claim 12, wherein said RC integrating element is connected to each pair of threshold switches for controlling operation of said indicator means in accordance with a time constant thereof.

14. An installation according to claim 13, wherein said pair of threshold switches are connected in parallel between said ignition switch means and said RC integrating element.

15. An installation according to claim 13, wherein said switching means include relay means having at least one normally closed contact, said closed contact remaining closed upon activating said power source by said ignition switch means for a time duration determined by the time constant of said RC integrating element to connect said indicator means to said power source, and thereafter said normally closed contact being opened.

16. An installation according to claim 15, wherein said indicator means includes at least one indicating lamp connected to each RC integrating element through said switching means.

17. An installation according to claim 16, wherein said indicator means includes at least one indicating lamp for indicating load distribution and at least one indicating lamp for indicating overloads.

18. An installation according to claim 16, wherein said indicator means includes at least one indicating lamp corresponding to each pair of threshold switches.

19. An installation according to claim 16, wherein said load-value transmitter means further includes a second pair of said threshold switches associated with at least one of the vehicle axles and having one threshold switch at respective lateral sides of the vehicle, wherein an RC integrating element is connected with said second pair of threshold switches, and wherein said switching means includes relay means having one normally closed contact connected between said RC integrating element and an indicating lamp for indicating an overload condition.

20. An installation in a vehicle for indicating load distribution and warning against overloads comprising an electrical power source and ignition switch means for activating said power source, load-value transmitter means coordinated to a vehicle axle including at least a first load value transmitter means having at least one load dependent threshold switch coordinated with the vehicle axle at respective lateral sides of the vehicle for detecting predetermined threshold load values, said threshold switches being operatively connected to said power source through said ignition switch means, indicator means for indicating load distribution and overload conditions of said vehicle, monitoring means connected to said threshold switches for monitoring functioning and/or operation of said indicator means, and switching means connected between said monitoring means and said indicator means for activating said indicator means, said load value transmitter means including at least a pair of said threshold switches, one threshold switch at respective lateral sides of the vehicle, said pair of threshold switches being normally opened to connect said power source to said monitoring means, and said monitoring means including an RC differentiating element, said threshold switches being connected in parallel to the condenser of said RC differentiating element.

* * * * *